(12) United States Patent
Larsson et al.

(10) Patent No.: US 7,175,005 B2
(45) Date of Patent: Feb. 13, 2007

(54) MODULAR DISC BRAKE

(75) Inventors: Hakan P. O. Larsson, Billeberga (SE); Ake Nelander, Bunkeflostrand (SE); Kjell Onnestam, Eslov (SE); Anders Ortegren, Landskrona (SE)

(73) Assignee: Haldex Brake Products AB (SE)

( * ) Notice: Subject to any disclaimer, the term of this patent is extended or adjusted under 35 U.S.C. 154(b) by 0 days.

(21) Appl. No.: 10/627,262

(22) Filed: Jul. 25, 2003

(65) Prior Publication Data

US 2005/0098395 A1 May 12, 2005

Related U.S. Application Data

(63) Continuation of application No. PCT/SE02/00130, filed on Jan. 25, 2002.

(30) Foreign Application Priority Data

Jan. 25, 2001 (SE) .................... 0100203-9

(51) Int. Cl.
 *F16D 55/08* (2006.01)
(52) U.S. Cl. ..................... 188/72.9; 188/72.1
(58) Field of Classification Search ............... 188/71.1, 188/72.1, 72.4, 72.6, 72.7, 72.9, 73.31, 73.32, 188/72.5, 72.8
See application file for complete search history.

(56) References Cited

U.S. PATENT DOCUMENTS

| 4,162,720 | A | * | 7/1979 | Haraikawa | ................. 188/72.7 |
| 4,163,481 | A | * | 8/1979 | Schoch | ....................... 188/72.9 |
| 4,313,526 | A | * | 2/1982 | Farr | ........................... 188/72.4 |
| 4,633,978 | A | * | 1/1987 | Hoff | ............................ 188/72.8 |
| 4,635,761 | A | * | 1/1987 | Smith et al. | ............... 188/72.9 |
| 5,172,792 | A | | 12/1992 | Cartwright et al. | ........ 188/71.1 |
| 5,433,298 | A | * | 7/1995 | Antony et al. | ............. 188/72.7 |
| 5,520,267 | A | | 5/1996 | Giering et al. | ............. 188/72.9 |
| 5,810,121 | A | | 9/1998 | Anger et al. | ............... 188/72.5 |
| 5,819,884 | A | | 10/1998 | Giering | ..................... 188/71.9 |
| 6,105,734 | A | | 8/2000 | Kuhne et al. | .............. 188/71.8 |
| 6,311,809 | B1 | * | 11/2001 | Thomas et al. | ............ 188/72.9 |
| 6,336,686 | B2 | * | 1/2002 | Thomas et al. | ............ 188/72.7 |
| 6,354,407 | B1 | * | 3/2002 | Heinlein et al. | ........... 188/71.1 |
| 6,367,592 | B1 | * | 4/2002 | Kapaan et al. | ............. 188/72.1 |
| 6,405,836 | B1 | * | 6/2002 | Rieth et al. | ................ 188/72.1 |
| 6,666,308 | B1 | * | 12/2003 | De Vries et al. | ........... 188/72.1 |

FOREIGN PATENT DOCUMENTS

| EP | 0 940 600 A1 | | 9/1999 |
| WO | WO 99/06725 A2 | * | 2/1999 |
| WO | WO 99/37010 A2 | * | 7/1999 |
| WO | WO 99/45292 A2 | * | 9/1999 |
| WO | WO 00/09908 | | 2/2000 |

* cited by examiner

*Primary Examiner*—Thomas Williams
(74) *Attorney, Agent, or Firm*—St. Onge Steward Johnston & Reens LLC

(57) ABSTRACT

The present invention concerns a modular disc brake, preferably for a heavy road vehicle. The modular disc brake comprises a frame, a house and a cover. A brake mechanism forming a single pre-mounted unit is received in the house. The modules are held together by means of pull rods and nuts. The house is received in a recess of the frame. The cover covers the end of the house. The frame is of a floating type having openings to receive sliding pins.

16 Claims, 3 Drawing Sheets

MODULAR DISC BRAKE

This application is a continuation of pending International Patent Application No. PCT/SE02/00130 filed Jan. 25, 2002, which designates the United States and claims priority of pending Swedish Application No. 0100203-9 filed Jan. 25, 2001.

FIELD OF THE INVENTION

The present invention concerns a modular disc brake. The disc brake is primarily intended for a vehicle, preferably a heavy road vehicle.

BACKGROUND OF THE INVENTION

The present invention is developed for use with different types of disc brakes. Thus, the invention is applicable for disc brakes having fixed caliper as well as disc brakes having sliding (floating) caliper. Traditionally the caliper of the disc brake is made in one piece and the brake mechanism is received in the caliper. This known design for a disc brake has both advantages and disadvantages. One disadvantage is that for maintenance, repair and/or exchange of parts of the brake mechanism normally all of the brake mechanism has to be taken out of the caliper. Furthermore, it is cumbersome to machine the caliper. Thus, there is a need for a disc brake which is more easy both to produce and to repair and maintain.

SUMMARY OF THE INVENTION

According to the present invention, a modular unit is replacing the traditional caliper. Said modular unit comprises a frame, a house and a cover. The machining of the frame is facilitated compared to the prior art where the frame, house and cover normally forms one single unit, i.e. the caliper.

The frame is of a fixed type or a sliding type. In the latter case it can be sliding on two or more slide pins. If there are more than two slide pins at least one of the slide pins is placed on the outboard side of the brake disc. The frame does not have to be disassembled for a possible change of mechanism.

One object of the present invention is to have a disc brake which is easy to produce and service.

A further object is to have a disc brake of reduced weight as compared to the prior art.

These objects are met by a modular disc brake having a brake mechanism and modules in form of a frame, a house and a cover.

Further objects and advantages will be obvious for a person skilled in the art when reading the detailed description below of a preferred embodiment.

BRIEF DESCRIPTION OF THE DRAWINGS

The invention will be described further below by way of an example and with reference to the drawings below. In the drawings.

DETAILED DESCRIPTION OF A PREFERRED EMBODIMENT

Figure 1:
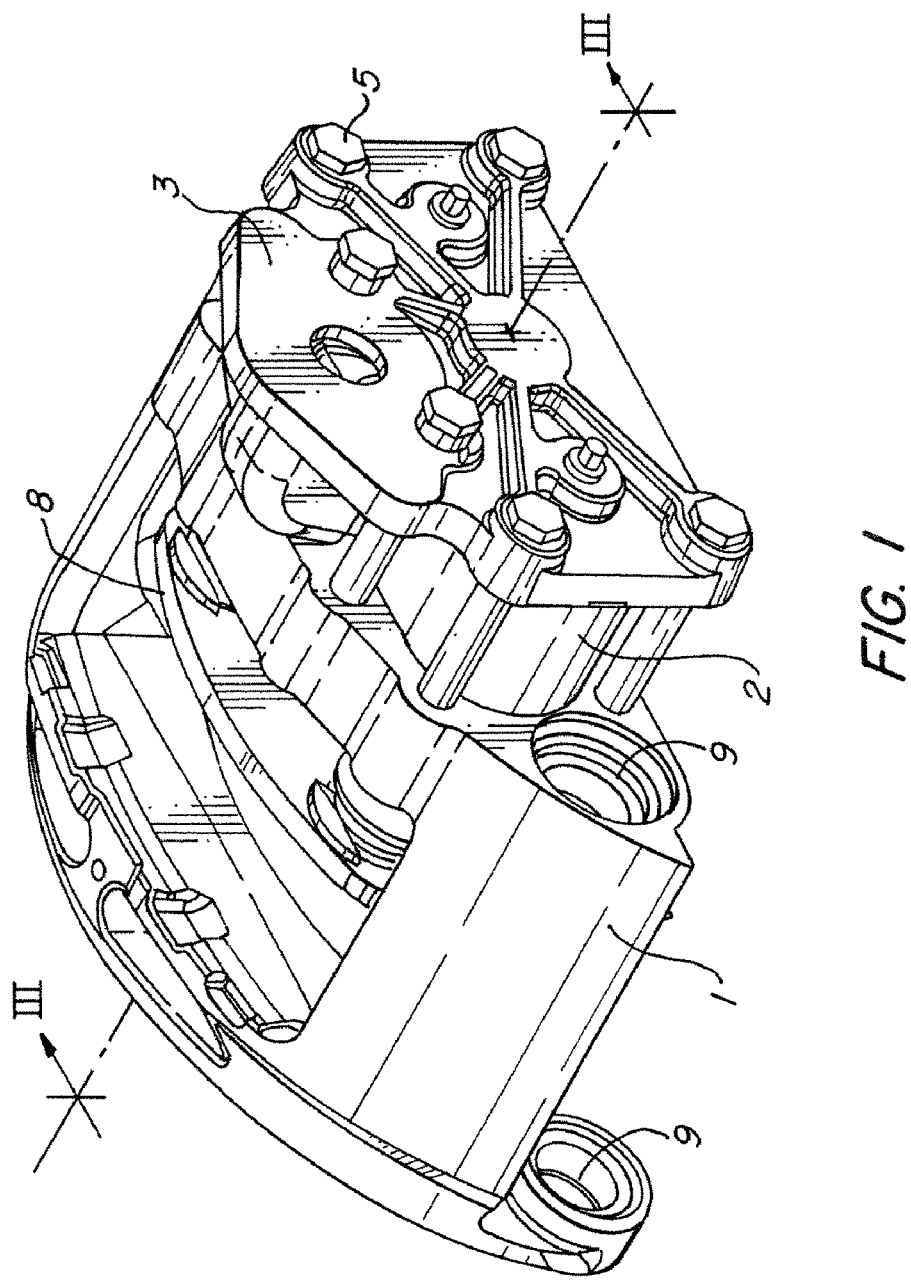
FIG. 1 is a perspective view of a disc brake according to the invention.

The disc brake of the invention is formed of a number of modules. In the shown example the modules are a frame 1, a house 2 and a cover 3. The brake mechanism 7 of the disc brake is a pre-mounted, single unit. In other embodiments (not shown) the brake mechanism does not form an own pre-mounted unit, but is pre-mounted in the house 2 or cover 3. The modules are kept together by a number of pull rods 4 and nuts 5.

The frame 1 has a recess 10 for receiving the lower part of the house 2. Thrust units of the brake mechanism 7 project through the bottom of the house 2 and through openings 11 at the bottom of the recess 10 of the frame 1 after assemble. The thrust units of the brake mechanism 7 are fixed to a thrust plate 8. The thrust plate 8 is received in a thorough opening 12 of the frame 1. In said thorough opening 12 of the frame 1 the brake disc (not shown) is also received. In the shown embodiment the frame 1 has four openings 9 for receiving sliding pins (not shown). A person skilled in the art realizes that the number of slide pins, and thus openings for the slide pins, may vary, normally from two and upwards. When the disc brake is activated the thrust plate 8 will in normal way press a brake pad (not shown) against the brake disc. At the same time the frame 1 will slide towards the brake disc on sliding pins received in the openings 9, in which sliding a brake pad (not shown) will be pressed against the opposite side of the brake disc. This is the normal function for a disc brake having a floating caliper. For brakes having a fixed frame 1 (caliper) there are no sliding pins.

The machining of the frame 1 is made simpler compared to traditional brakes, where the frame 1, house 2 and cover 3 normally are integrated parts of one single unit, i.e. the caliper. Multiple sliding pins give a more stable construction than using two sliding pins, which is common within the state of the art.

Figure 3:
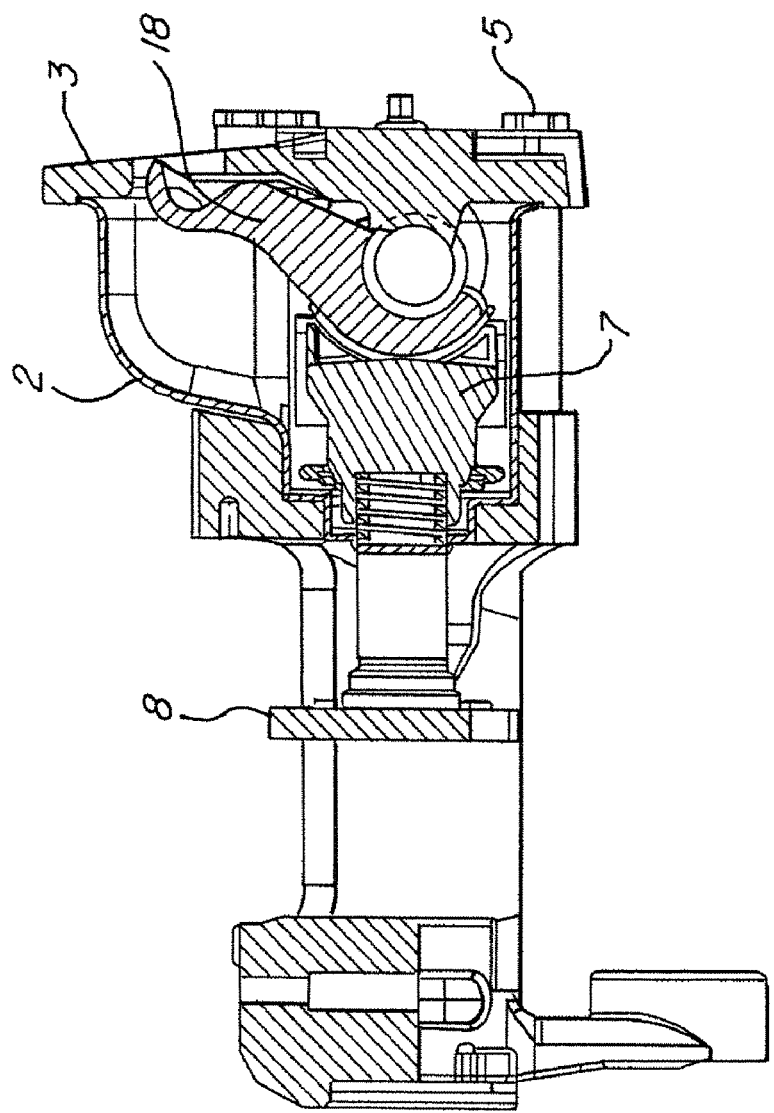
FIG. 3 is a cross section view taken along the line III—III of FIG. 1.

The house 2 will receive the brake mechanism 7 when the disc brake is assembled. In the bottom of the housing 2 there are two thorough openings for the thrust units as indicated above. Furthermore, the house 2 is furnished with a space for receiving the lever 18 of the brake mechanism 7. As illustrated in FIG. 3, the house 2 also encloses the lever 18 of the brake mechanism. In other embodiments (not shown) the brake mechanism has only one thrust unit, in which case the house 2 will only have one opening in the bottom.

The function of the house 2 is to protect against dirt and moisture. The house 2 will not take up any load and thus it may be made of material having low weight, such as plastic or metal, which is of advantage regarding the total weight of the disc brake.

The brake mechanism 7, which may have one or more thrust units, may be pre-mounted in the cover 3 or the house 2 or may alternatively be pre-mounted as a separate unit. The brake mechanism as such, does not form any part of the present invention and will thus not be described further here. A person skilled in the art realizes that the brake mechanism may have many different designs without departing from the present invention.

Figure 2:
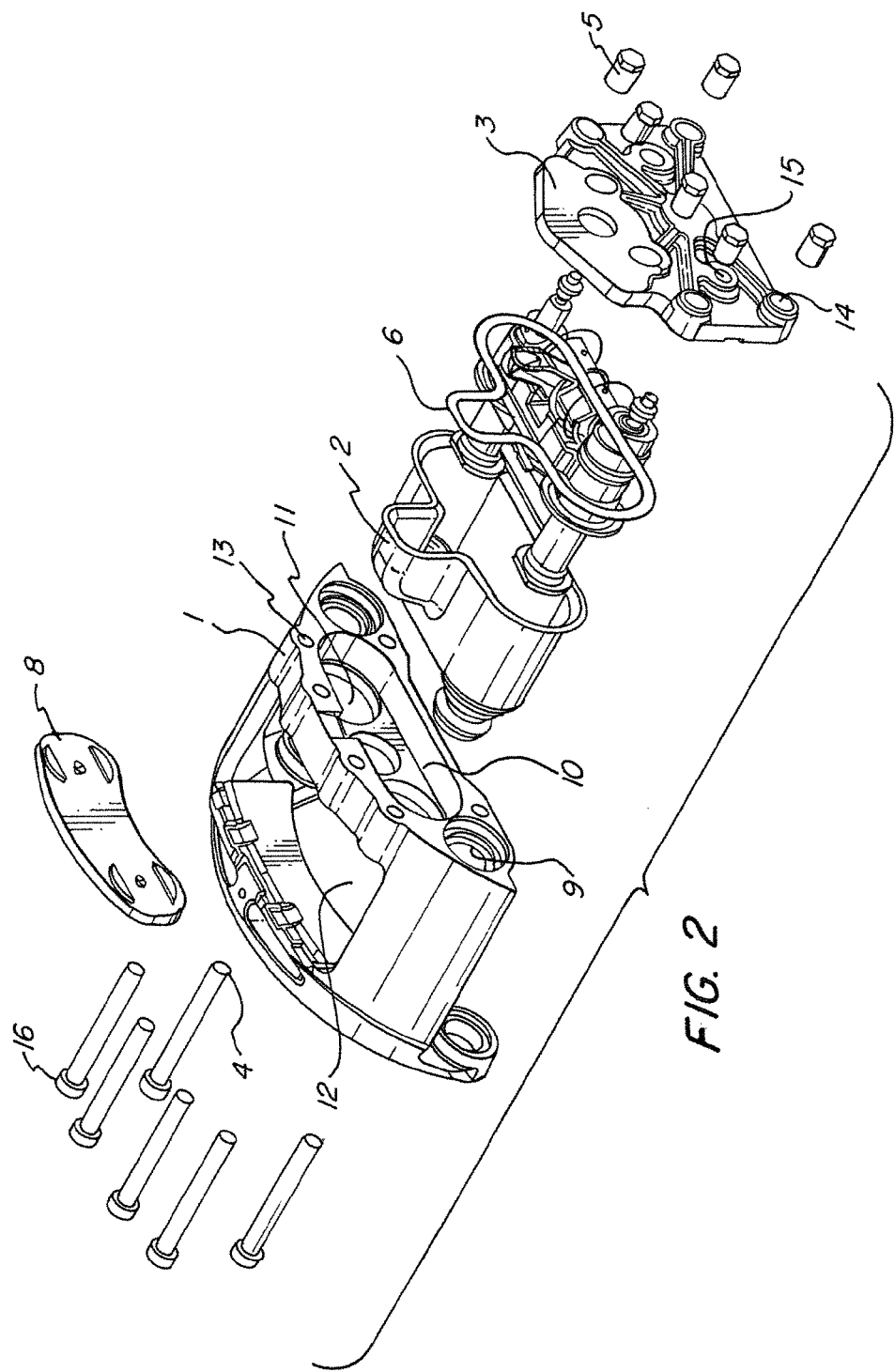
FIG. 2 is an exploded view of the disc brake of FIG. 1.

Finally a cover 3 is provided to cover the opening of the house 2. The cover 3 is provided with a number of openings 14, to receive pull rods 4. Each pull rod 4 has a head 16 at one end and is threaded at the other end to receive nuts 5. Even though the pull rods 4 are shown with the heads 16 at the frame 1 and the threaded ends at the cover 3, a person skilled in the art realizes that the pull rods 4 may be inserted the other way around. Thus, the pull rods 4 may have the heads 16 at the cover 3. The pull rods 4 have a predetermined length. The length of the pull rods 4 is somewhat longer than the length of the house 2. As illustrated in FIG. 2, the pull rods 4 clamp between the frame 1 and the cover 3 without passing through the house 2. The predetermined length is adapted to the wish to attain flexible pretension for the system of house 2, gasket 6, cover 3 and frame 1. In the shown embodiment there are six pull rods, but a person skilled in the art realizes that any number of pull rods 4 may be used as long as a sufficient fixation is established.

In order to enable pre-tension of the pull rods 4 and accurate distance between the cover 3 and the frame 1, the pull rods 4 may be surrounded by spacing sleeves.

The cover 3 has further openings for the ends of the thrust units, which is needed for adjustment of the position of the brake pads in relation to the brake disc. Furthermore a gasket 6 is received and held between the house 2 and the cover 3.

When the disc brake is assembled the brake mechanism 7 is brought down into the house 2. The house 2 is then brought into the recess 10 of the frame 1. When the house 2 is brought into the frame 1, the thrust units will go through the openings 11 at the bottom of the recess 10. The thrust plate 8 is then fixed to the brake mechanism 7 by means of the thrust units. Thereafter the pull rods 4 are inserted in pull rod openings 13 of the frame 1 and pull rod openings 14 of the cover 3 are placed on the pull rods 4. At least the ends of the pull rods 4 closest to the cover 3, when the disc brake has been assembled, are furnished with threads. Nuts 5 are screwed onto the pull rods 4 to assemble the disc brake. A gasket 6 is normally placed between the house 2 and cover 3 before the disc brake is assembled.

The different parts of the disc brake of the invention are adapted to each other regarding actual form and other design considerations.

1. frame
2. house
3. cover
4. pull rod
5. nut
6. gasket
7. brake mechanism
8. thrust plate
9. opening in frame
10. recess
11. opening for thrust unit
12. thorough opening
13. opening for pull rod
14. opening for pull rod
15. opening for thrust unit
16. head of pull rod

The invention claimed is:

1. A modular disc brake comprising a service brake mechanism having a plurality of thrust units and modules in form of a frame, a cover, and a house for a service brake mechanism, at least a part of said house positioned between and outside said frame and said cover and mounted to be substantially unloaded during braking;
    wherein said frame includes a recess having a bottom, the bottom of the recess having a plurality of openings adapted to allow the plurality of thrust units to pass therethrough;
    wherein said house comprises a bottom, the bottom of said house having a plurality of through openings therein adapted to allow the plurality of thrust units to pass therethrough; and
    wherein said house is disposed within the recess in said frame such that the plurality of through openings in the bottom of said house are aligned with the plurality of openings in the bottom of the recess such that the plurality of thrust units pass through the bottom of said house and the bottom of the recess.

2. The disc brake of claim 1, characterized in that a lower part of the house is received in the recess.

3. The disc brake of claim 2, characterized in that the house is made of a plastic material.

4. The disc brake of claim 1 characterized in that the brake mechanism is a single pre-mounted unit received in the house.

5. The disc brake of claim 3, characterized in that the brake mechanism is pre-mounted in the house or cover.

6. The disc brake of claim 5, characterized in that the cover is attached in such a way that it covers an open end of the house.

7. The disc brake of claim 6, characterized in that the house is open in one direction to receive the brake mechanism; that it has one or more openings for connection of one or more thrust units of the brake mechanism with one or more thrust plates; and that it has a space for receiving a lever of the brake mechanism.

8. The disc brake of claim 7, characterized in that the frame and cover has openings to receive a number of pull rods, which pull rods are clamped between the frame and the cover in that nuts are received on one end of each pull rod and that the pull rods have a head at the other end.

9. The disc brake of claim 8, characterized in that a gasket is received between the house and the cover.

10. The disc brake of claim 9, characterized in that the house is pre-tensioned by means of the pull rods.

11. The disc brake of claim 1, wherein the house receives a lever of the brake mechanism.

12. The disc brake of claim 1, wherein a number of pull rods are clamped between the frame and the cover without passing through the house.

13. A modular disc brake comprising a brake mechanism having a plurality of thrust units and modules in form of a frame, a house, a cover, and a number of pull rods, wherein the number of pull rods clamp between the frame and the cover without passing through the house and the house is pre-tensioned by means of the pull rods;
    wherein said frame includes a recess having a bottom, the bottom of the recess having a plurality of openings therein;
    wherein said house comprises a bottom, the bottom of said house having a plurality of through openings therein; and
    wherein said house is disposed within the recess in said frame such that the plurality of through openings in the bottom of said house are aligned with the plurality of openings in the bottom of the recess such that the plurality of thrust units pass through the bottom of said house and the bottom of the recess.

14. A modular disc brake comprising a service brake mechanism having a plurality of thrust units and modules in form of a frame, a house for the service brake mechanism and a cover, wherein, the house is mounted not to take up any load during braking and the house is made of plastic material;
    wherein, the brake mechanism is a single pre-mounted unit received in the house and the brake mechanism is pre-mounted in the house or cover;
    wherein, the cover is attached in such a way that it covers an open end of the house;
    wherein, the house has a space for receiving a lever of the brake mechanism;

wherein, the frame and cover have openings to receive a number of pull rods, which pull rods are clamped between the frame and the cover in that nuts are received on one end of each pull rod and the pull rods have a head at the other end;

wherein said frame includes a recess having a bottom, the bottom of the recess having a plurality of openings therein;

wherein said house comprises a bottom, the bottom of said house having a plurality of through openings therein; and wherein said house is disposed within the recess in said frame such that the plurality of through openings in the bottom of said house are aligned with the plurality of openings in the bottom of the recess such that the plurality of thrust units may be passed through the bottom of said house and the bottom of the recess.

15. The disc brake of claim 14, wherein, a gasket is received between the house and the cover.

16. The disc brake of claim 15, wherein, the house is pre-tensioned by means of the pull rods.

\* \* \* \* \*